United States Patent [19]

Evelyn-Veere

[11] Patent Number: 5,023,787
[45] Date of Patent: Jun. 11, 1991

[54] IRRIGATION CONTROL AND FLOW MANAGEMENT SYSTEM

[75] Inventor: Rene H. Evelyn-Veere, Alta Loma, Calif.

[73] Assignee: Rainbird Sprinkler Mfg. Corp., Glendora, Calif.

[21] Appl. No.: 307,867

[22] Filed: Feb. 6, 1989

Related U.S. Application Data

[63] Continuation-in-part of Ser. No. 151,318, Feb. 1, 1988, abandoned.

[51] Int. Cl.$^5$ .............................................. A01G 25/16
[52] U.S. Cl. ....................................... 364/420; 239/69
[58] Field of Search .................... 364/420; 239/67, 68, 239/69, 70; 137/624.11, 624.13, 624.14, 624.15, 624.18, 624.19, 624.2

[56] References Cited

U.S. PATENT DOCUMENTS

| | | | |
|---|---|---|---|
| 4,015,366 | 4/1977 | Hall, III | 364/420 |
| 4,176,395 | 11/1979 | Evelyn-Veere et al. | 364/420 |
| 4,548,225 | 10/1985 | Busalacchi | 239/69 |
| 4,646,224 | 2/1987 | Ransburg et al. | 364/143 |
| 4,712,376 | 12/1987 | Hadank et al. | 60/427 |
| 4,821,580 | 4/1989 | Jorritsma | 73/861 |

FOREIGN PATENT DOCUMENTS

0030381  3/1979  Japan ................................. 364/420

Primary Examiner—Jerry Smith
Assistant Examiner—David Huntley
Attorney, Agent, or Firm—Kelly, Bauersfeld & Lowry

[57] ABSTRACT

Method and apparatus for controlling an irrigation system within prescribed limits of pump capacity and flow capacity through defined local zones. Watering schedules may be all simultaneously activated and will make multiple requests for watering time, for posting in a flow management roster. The requests in the roster are processed and satisfied only if overall pump capacity permits and if local flow zone capacities are not exceeded. Pump capacity is expanded incrementally as more requests are processed, but only in accordance with predefined limits on the conditions that have to be met before moving to an expanded capacity. This flow management technique is best employed with a cycle-and-soak feature to avoid runoff problems at selected sites, and using an evapotranspiration approach to vary the watering times in accordance with changing weather conditions.

18 Claims, 4 Drawing Sheets

IRRIGATION CONTROL AND FLOW MANAGEMENT SYSTEM

CROSS-REFERENCE TO RELATED APPLICATION

This is a continuation-in-part of Ser. No. 07/151,318, filed Feb. 1, 1988, entitled "Irrigation Control Using Evapotranspiration Data," by Rene H. Evelyn-Veerer, now abandoned.

BACKGROUND OF THE INVENTION

This invention relates generally to large irrigation control systems of the type used in the irrigation of agricultural land or golf courses. More specifically, the invention relates to techniques for efficient control of irrigation water by taking into account the capacity and limitations of water pumps and water distribution components through which the water flows.

In the cross-referenced application, a system is described for the control of irrigation using evapotranspiration data derived from a weather observation station. For purposes of irrigation control, the weather data can be reduced to a single quantity referred to as ET, for evapotranspiration, measured in inches (or millimeters) of water over a 24-hour period. For a particular crop, such as a grass, the value of ET represents the amount of water that has to be spread over the crop each day to replace the moisture lost by the natural and ongoing process of evaporation and transpiration. The cross-referenced application provides a convenient technique for applying ET data to vary watering times qualitatively in accordance with changing weather conditions, but without necessarily using an absolute ET value for each watering station. Another feature disclosed in the cross-referenced application was the ability to store adjustments to the ET level for different geographic zones under irrigation. Yet another important feature allows an operator of the system to define a minimum soak time and a maximum cycle time for any watering station. When this feature is used, watering time is not permitted to exceed the specified cycle time, and is not permitted to begin again until the specified soak time has elapsed, regardless of the total watering time required as a result of the ET level or specified by the operator.

Operation under ET control relieves operator of the burden of having to modify the control system in accordance with daily or seasonal changes in the weather. Cycle-and-soak control avoids overwatering in specific areas that are incapable of holding the water dictated by the weather and crop conditions. For example, steeply sloping ground or some types of soils may not absorb water fast enough to avoid run-off. However, in spite of these significant improvements many irrigation systems operate very inefficiently because they water with little or no regard for the capacity of pumps and water distribution components supplying the water. In large irrigation systems, water is typically pumped to the various irrigation stations by a number of water pumps that can be brought into service as needed. When a complete daily irrigation cycle is completed without regard to the pump capacities, there will often be many large peaks in pump load, as well as times when the pump load falls off to practically nothing. Pump maintenance problems are aggravated by these cyclic load conditions. It would be preferable to maintain a practically constant load on the pumps throughout a watering cycle.

Another difficulty that most irrigation systems totally ignore is that the amount of water that can be "thrown" at any particular watering station is limited by the network of water pipes through which the water is delivered. Although this fact is appreciated by most system operators, taking account of it in scheduling watering operations is a most difficult task. In many irrigation systems, water is delivered from the pumps into a ring-shaped header or manifold, and from this into radiating arms connecting to sprinkler heads. Calculating water flows through such a complex configuration is difficult to say the least, and may be further aggravated in an older system in which the details of the network configuration may not be accurately known.

Nevertheless, it will be appreciated that there is much to be gained from controlling irrigation automatically to regulate pump operation in such a manner as level out pump demand as far as possible, and to take into account flow limitations imposed by the water delivery network. The present invention achieves these goals, as will be apparent from the following summary of the invention.

SUMMARY OF THE INVENTION

The present invention resides in an irrigation control system that automatically controls irrigation schedules to regulate pump operation to provide an approximately level demand for pump capacity over a complete watering cycle, and to take account of any restrictions imposed by the water distribution network.

Briefly, and in general terms, the method of the invention includes defining the watering times for a plurality of irrigation stations, placing the defined watering times as flow requests in a flow management roster, and processing the flow requests. Processing the flow requests includes granting requests based on availability of pump capacity and maintaining flow in local zones below designated maxima, and updating the flow management roster as watering continues, to reflect the passage of time and the current total flow conditions.

More specifically, the step of granting requests includes determining the flow capacity presently available in a predefined watering zone in which each station is located, denying the request if granting it would exceed the zone capacity for water flow, determining the current pump capacity of the irrigation system, the currently running flow rate in the system, and the currently requested additional flows, and denying the request if the currently requested flows in the system are insufficient to justify incrementally expanding the current pump capacity of the system.

In the disclosed method of the invention, the step of granting requests also includes comparing the total of currently running and currently requested flow rates with a maximum overload flow rate associated with each incremental step in pump capacity, and expanding the pump capacity by one increment if the compared total is greater than the overload flow rate. The step of granting requests also includes delaying expansion to a new pump capacity increment if the current incremental level has been in effect less than a time limit previously defined for each incremental level.

The basic method of the invention is also conveniently adaptable to cycle-and-soak operation, whereby selected stations are defined to have a maximum watering cycle time and a minimum soak time between watering cycles. The flow management technique of the invention breaks the total watering time for each of these selected stations into multiple cycle times separated by minimum soak times.

The invention may also be expressed in the form of apparatus, comprising means for defining the watering times for a plurality of irrigation stations, means for placing the defined watering times as flow requests in a flow management roster, and means for processing the flow requests from the flow roster. The means for processing the flow requests further includes means for granting requests based on availability of pump capacity and maintaining flow in local zones below designated maxima, and means for updating the flow management roster as watering continues, to reflect the passage of time and the current total flow conditions.

The method of the invention, when combined with the evapotranspiration technique also described in this specification, comprises the steps of supplying a watering schedule having a plurality of programmed watering times for a plurality of stations, supplying a reference ET level (ETR) that is a representative measure of the depth of water to be spread per day in an irrigation schedule, supplying a weather ET value representative of the weather conditions currently prevailing, adjusting the programmed watering times in the schedule by a factor proportional to the ratio (ET/ETR), whereby the watering times will be varied qualitatively in proportion to the weather ET value, placing the watering times as flow requests in a flow management roster, and processing the flow requests in the flow roster. As before, the step of processing the flow requests may include granting requests based on availability of pump capacity and maintaining flow in local zones below designated maxima, and updating the flow management roster as watering continues, to reflect the passage of time and the current total flow conditions.

It will be appreciated that the present invention represents a significant advance in the field of irrigation control systems. In particular, the invention is a departure from conventional irrigation control systems, in that initiation of watering at various stations is controlled automatically and is not limited by the sequence implied by watering schedules, but instead using the available pump capacity as efficiently as possible, without exceeding predefined limits for flow in local zones. The flow management technique of the invention also works advantageously with ET control of watering times and with cycle-and-soak operation at selected stations. Other aspects and advantages of the invention will become apparent from the following more detailed description, taken in conjunction with the accompanying drawings.

DESCRIPTION OF THE PREFERRED EMBODIMENT

Overview

As shown in the drawings for purposes of illustration, the present invention is concerned with an automatic irrigation control system in which pump capacity and distribution network limitations are taken into account in planning an irrigation schedule of operations. The system of the invention will be described as also employing the principles of evapotranspiration (ET) control, as fully described in the cross-referenced application. Before the principles of flow management can be meaningfully described, it is appropriate to first describe a basic irrigation control system and the ET principles set forth in the cross-referenced application.

Figure 1:
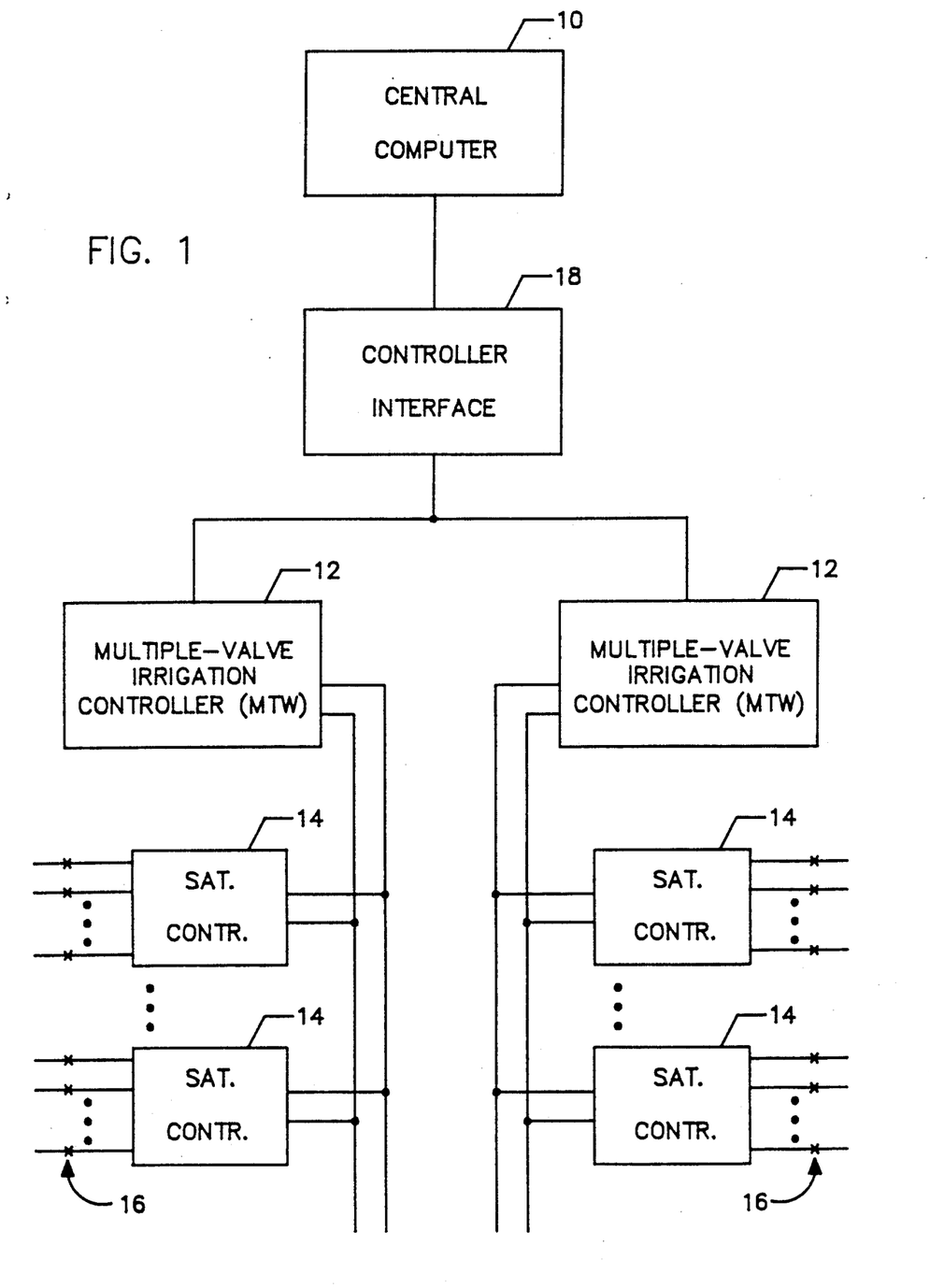
FIG. 1 is a block diagram of an irrigation control system into which the present invention is incorporated.

The type of system to which the principles of the present invention can be applied is shown in the block diagram of FIG. 1, by way of example. The overall configuration includes a central computer, indicated by reference numeral 10 and ideally taking the form of a microcomputer, and one or more multiple-station irrigation valve controllers, two of which are shown at 12. The specific nature of the controllers 12 will vary in accordance with the specific application and the equipment selected. By way of example, the controllers 12 may be multiple- two-wire (MTW) controllers, such as disclosed in U.S. Pat. No. 4,131,882, to Michael D. Hollabaugh, entitled "Digital Two-Wire Irrigation Control System with Feedback." Each two-wire controller 12 is connected by pairs of wires to multiple groups of satellite controllers 14, each of which controls multiple irrigation stations 16. Each irrigation station provides electrical control for a single valves, or for several valves operated together. Also included in the configuration is a controller interface 18, interposed between the computer 10 and the controllers 12. The computer sends and receives data through a communications port, typically a conventional serial data port, and the interface 18 provides the necessary translation of this data, and for output to the controllers and for the return transmission of data from the controllers back to the computer 10. The specifics of the interface design are dependent on the particular controllers selected, and are not relevant to the present invention.

Control using ET

As is readily apparent, the application of a single ET value to control the watering times at a large number of stations does not take account of variations in local conditions, including weather conditions, such as shade and wind, and ground conditions, such as slope, soil composition, slope, and so forth. One approach to this difficulty would be to enter large amounts of data concerning every local condition, and to factor these conditions into the ET equations, effectively generating a new ET value for each local area under irrigation. This approach is subject to errors due to incorrect data, and due to incorrect assumptions made in modifying the basic ET equations. Use of this approach nearly always requires subsequent corrections to be entered.

The approach followed in the present invention is not to attempt any modification of the basic ET equations in the control system. Instead, modification is left to the supervisory operator of the system, using programming aids provided by the control system of the invention. More specifically, the approach taken is based on the strategy that an ET value may be used as a reference level rather than an exact indicator, and that it is more important to control the watering times in accordance with the relative change of ET from day to day, rather than strictly in accordance with the absolute ET value.

This strategy permits operation in a qualitative manner rather than in a strictly quantitative manner. Qualitative operation has two principal advantages. First, it is more consistent with the way watering has been manually controlled in the past. For example, on dry days, one has to water more. How much more was in the past determined by experience, with possible reference to weather data such as humidity readings and past rainfall data. In any event, it was a qualitative adjustment, made to the watering times of the separate watering stations. The second advantage is that qualitative operation in the manner to be described facilitates a transition to quantitative operation, in which the total amount of water spread over the area is substantially equivalent to the measured ET level.

The principles of the invention are best explained with reference to the block diagram of FIG. 2, the upper portion of which (above the broken line) illustrates operation in a qualitative mode. Information from a weather station 20 is analyzed by known techniques to produce a potential ET level 22, representative of the loss of moisture due to all measured parameters of evapotranspiration. This is the theoretical amount of water (in inches) that must be spread over the "crop" to replace the moisture lost in a 24-hour period.

As indicated in block 24, this potential ET value is modified to produce an array of ET levels referred to as ETZ, for ET-zone. This represents an adjustment made on a location basis. That is to say, the entire area under irrigation is divided into geographic zones, each of which is assigned a different ET adjustment value. For this purpose, the operator is provided with a data base in computer memory referred to as the ET-Adjust data base. This is a set of values, one for each zone, representing a percentage adjustment factor for each zone. The database has the ability to modify the ET level for each station, if desired, although modification by zone will normally be sufficient. The operator builds and modifies this data base in accordance with prior experience, and based on observed weather and soil conditions. Such factors as sun exposure, wind exposure, soil conditions, and plant conditions have to be taken into account, but only on an overall estimated basis. What is intended is that the operator provide an ET adjustment factor for the entire zone. An adjustment factor of 100% means that no adjustment is necessary. Less than 100% means that less water is needed, perhaps because of the presence of large shady areas. More than 100% means that more water is needed, such as in open, sunny areas, or with high wind exposure.

As shown in block 24, the adjustment factors, referred to as Az, are each multiplied by the theoretical ET level to produce an array of ET values (ETZ) adjusted by zone, or even by station, as indicated at 26. In block 28, the concept of a reference ET level (ETR) is introduced. ETR is a value selected by the operator as being representative of the watering schedule typically employed. It is the number of inches of water "thrown" by all of the sprinklers in a watering schedule on a typical day. Its precise value is not of great significance, except to the extent that the operator should choose a realistic value, so that the resultant watering times are practical ones. In block 28, each originally programmed watering time, T(prog), is adjusted by a factor computed as the ratio ETZ/ETR. In other words T(adjusted) T(prog) ×(ETZ/ETR). As will be discussed further, this adjustment takes place at the time a watering schedule is executed, but the adjusted watering times may be computed in advance to simulate the complete schedule without actually watering.

For purposes of explanation, suppose for a moment that no zone adjustments are made in ETZ, i.e. ETZ=ET for all zones. Suppose also that, on a particular day, the operator selects the reference ETR to be equal to the weather station ET for that day. The ratio ETZ/ETR would then be unity for all zones, and the watering times would not be adjusted at all, i.e. T(adjusted) would be equal to T(prog) for all stations in the system. Now consider what happens when the weather changes. If the weather gets warmer and drier, the ET level from the weather station will rise, indicating an increased need for water. If ET increases by, say, 10% as a result of the warmer weather, the values of ETZ will be increased by a like amount, as will the ratios ETZ/ETR, and the adjusted watering times T(adjusted) will be increased by 10% over the programmed times T(prog). A similar, but opposite, correction will be made if the weather becomes cooler and wetter. If zone ET adjustments are now considered, the qualitative result is still the same. Each zone's component of ETZ will move up or down in the same direction as and in proportion to the changes the weather-derived ET level.

If a different ETR reference is selected, there is still day-by-day "tracking" of the weather changes reflected in the weather station ET level, even though the initially selected reference level was too high or too low. This is the mode of operation referred to as qualitative. Its principal purpose is to introduce the operator to system of automatic system control using evapotranspiration data, but without having to input large amounts of data concerning every irrigation zone in the system. To begin operation using qualitative ET control, the operator merely has to supply a single reference ET value ETR for the schedule under consideration and ET adjustment factors for each irrigation zone, or for each station if desired. The factors can be initially approximate, because they can be easily adjusted and, as will be discussed, there are simulation techniques available to test the reasonableness of the inputs without actually spilling any water.

If an existing schedule has been in satisfactory operation for some time, the programmed watering times may already reflect approximate differences in local conditions in each zone. For example, shady areas will have been programmed to receive less water than sunny, exposed areas. Therefore, satisfactory ET operation can be achieved by merely selecting all of the zone ET adjustment factors to be 100%. Therefore, for already established watering schedules, the operator need only select an ETR level, and satisfactory operation can begin, using ET control on a qualitative basis.

Figure 2:
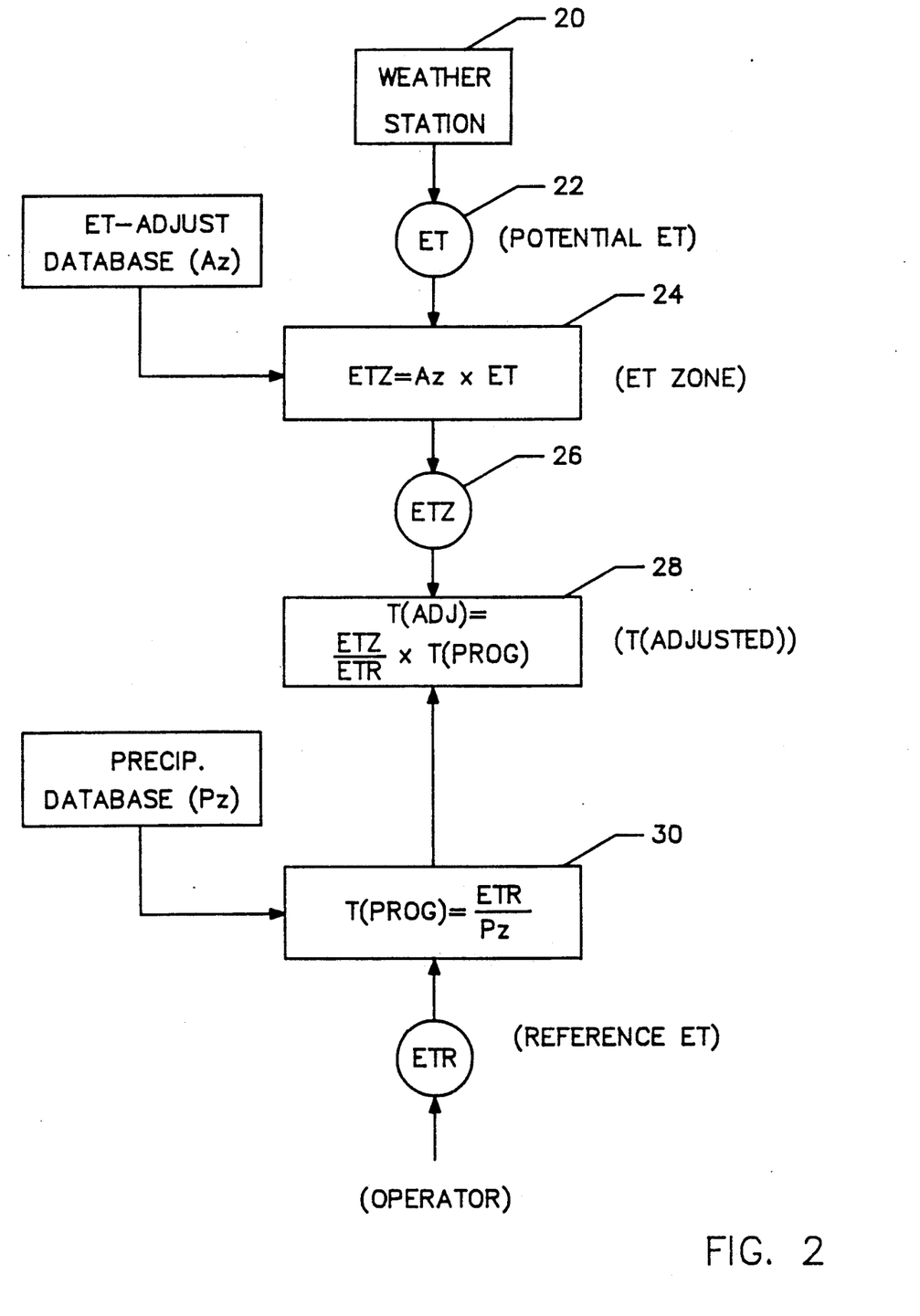
FIG. 2 is a block diagram showing the combined approaches of qualitative and quantitative ET-derived control of an irrigation system.

Quantitative operation of ET control of the system requires a further step, shown in the lower portion of FIG. 2. Another data base maintained by the operator contains precipitation data for every station in the system. These are water distribution rates, usually in inches per hour, based on known gallons-per-minute figures for each valve, and on known distribution patterns of the sprinklers. Typically, the sprinklers associated with the valves are arranged in a relatively small number of predetermined patterns to achieve desired precipitation rates. The precipitation figures are usually known design factors, since it is the work of a system designer or golf course architect, to provide predetermined precipitation rates in various locations.

As shown in block 30, in quantitative operation of the system, the programmed watering times T(prog) at the stations are set to be equal to ETR/Pz, where ETR is the reference ET level supplied by the operator and Pz is the precipitation rate for the station. In quantitative ET operation, these program watering times T(prog) may be computed either when the watering schedule is created or modified, or at schedule execution time, as will be explained. The final step of adjustment, shown in block 28, is computed at schedule execution time.

In quantitative operation of the ET control system, the actual value selected for ETR is irrelevant, since:

$$T(\text{adjusted}) = T(\text{prog}) \times (ETZ/ETR)$$
$$= (ETR/Pz) \times (ETZ/ETR)$$
$$= (ETZ/Pz).$$

Therefore, in quantitative ET operation the watering times will not only track weather changes accurately from day to day, but should also closely correspond to the predicted moisture loss by evapotranspiration on any given day. However, in quantitative operation, it is important to employ good estimates of the ET adjustment factors, since any previously established schedule watering times are no longer employed. Therefore, all local differences must be accounted for in the ET adjustment factors.

It will by now be apparent that a principal purpose of the present invention is to facilitate the transition to ET-controlled operation from conventional, timed operation. One aspect of a smooth transition is the ability to operate the system in the qualitative ET mode, without initially making any changes to the scheduled watering times. Other aspects of the invention relate to programming aids that facilitate the transition from qualitative to quantitative operation.

First, it is important to note that the operator does not need to switch from qualitative to quantitative operation for the whole system at once, or even for a whole schedule at once. Quantitative operation is selectable on a station-by-station basis, so that the operator can focus on a single zone being watered, and derive an appropriate ET adjustment factor that will result in reasonable watering times, based on the operator's past experience. To assist the operator in this task, the system provides two important tools: a conversion spreadsheet and an ET spreadsheet.

The conversion spreadsheet converts inches of water to run times in minutes, based on the precipitation rates available in the precipitation data base. This has two benefits. First it helps the operator make a mental adjustment from conventional time-based irrigation control techniques to the "inches-based" approach necessitated by ET control of irrigation. Secondly, it provides a useful aid to the determination of a reference ET value. TABLE 1 is a representation of the operator screen showing a typical conversion spreadsheet.

TABLE 1

| CONVERSION spreadsheet - Station times in minutes for indicated inches of water |
| For .15 inches Total Gallons = 128079 |

|   |   |    |    |    |    |    |    |    |    |    |    |    |    |    |   |
|---|---|----|----|----|----|----|----|----|----|----|----|----|----|----|---|
|   | 12 | 21 | 9  | 26 | 36 | —  | 21 | —  | 15 | 26 | 15 | 21 | 9  | —  | 2 |
|   | 11 | 21 | 9  | 26 | 36 | —  | 21 | —  | 15 | 26 | 15 | 21 | 9  | —  | 2 |
| S | 10 | 21 | 9  | 26 | 36 | 14 | 21 | —  | 15 | 26 | 15 | 21 | 9  | 14 | 2 |
| A | 9  | 21 | 9  | 26 | 36 | 14 | 21 | —  | 15 | 26 | 15 | 21 | 9  | 14 | 2 |
| T | 8  | 21 | 9  | —  | 36 | 14 | 21 | 24 | 15 | 26 | 15 | 21 | 9  | 14 | 2 |
|   | 7  | 21 | 9  | —  | 36 | 14 | 21 | 24 | 15 | 26 | 15 | 21 | 9  | 14 | 2 |
|   | 6  | 21 | 75 | —  | 36 | 14 | 21 | 24 | 15 | 26 | 15 | 21 | 9  | 14 | 2 |
|   | 5  | 21 | 21 | —  | 36 | 14 | 21 | 24 | 15 | 26 | 26 | 21 | 9  | 14 | 2 |
| S | 4  | 21 | 21 | 14 | 36 | 14 | 21 | —  | 15 | 26 | 26 | 21 | 9  | 14 | 2 |
| T | 3  | 21 | 21 | 75 | 36 | 14 | 21 | —  | 15 | 26 | 26 | 21 | 9  | 14 | 2 |
| A | 2  | 21 | 21 | 75 | 36 | 14 | 21 | —  | 15 | 26 | 26 | 21 | 9  | 14 | 2 |
|   | 1  | 21 | 21 | 75 | 36 | 14 | 21 | —  | 15 | 26 | 26 | 21 | 9  | 14 | 2 |
| DEVICE |  | S1 | S2 | S3 | S4 | S5 | S6 | S7 | S8 | S9 | S10 | S11 | S12 | S13 | S14 |

| GROUP - 1 | SATELLITE or CHANNEL number |
| [F5]-Toggle page [F6]-Select GROUP [F7]-Change inches [F8]-Display other data |

By selecting a value of inches of water to be spread by the system, the operator can observe the effect that this has on the watering times of the various stations in a selected schedule. Based on past experience, the operator can determine whether the watering times are realistic or not, for given weather conditions. This will help determine a realistic ETR level for use in the system, and also help the operator to think in terms of inches of water rather than minutes of watering time.

The numbers across the bottom of the table refer to satellite or channel numbers, and the numbers in the left-hand column are station numbers. The F numbers in brackets beneath the spreadsheet refer to function keys on the computer keyboard, which allow the operator to select other functions relative to the spreadsheet operation. For example, F7 permits the operator to select another value for inches of water, F5 permits the viewing of other channels in the same group of channels, and F6 selects a different group of channels.

The other important operator programming tool is the ET spreadsheet, an example of which is shown in TABLE 2 below.

TABLE 2

| ET spreadsheet |
| ET-adjusted station times in minutes |
| For .12 ET Total Gallons = 100999 |

|    |    |   |    |    |   |    |   |    |    |    |    |   |   |   |
|----|----|---|----|----|---|----|---|----|----|----|----|---|---|---|
| 12 | 17 | 7 | 21 | 29 | — | 17 | — | 12 | 21 | 12 | 17 | 7 | — | 2 |
| 11 | 17 | 7 | 21 | 29 | — | 17 | — | 12 | 21 | 12 | 17 | 7 | — | 2 |

TABLE 2-continued

ET spreadsheet
ET-adjusted station times in minutes
For .12 ET Total Gallons = 100999

|   |    |    |    |    |    |    |    |    |    |    |    |    |    |    |    |
|---|----|----|----|----|----|----|----|----|----|----|----|----|----|----|----|
| S | 10 | 21 | 7  | 16 | 29 | 11 | 17 | —  | 12 | 21 | 12 | 17 | 7  | 11 | 2  |
| A | 9  | 21 | 7  | 16 | 29 | 17 | 17 | —  | 12 | 21 | 12 | 17 | 7  | 11 | 2  |
| T | 8  | 21 | 7  | —  | 29 | 11 | 17 | 19 | 12 | 21 | 12 | 17 | 7  | 11 | 2  |
|   | 7  | 15 | 7  | —  | 29 | 14 | 17 | 19 | 12 | 21 | 12 | 17 | 7  | 11 | 2  |
|   | 6  | 17 | 60 | —  | 29 | 14 | 17 | 19 | 12 | 21 | 12 | 17 | 7  | 11 | 2  |
|   | 5  | 19 | 15 | —  | 29 | 14 | 17 | 19 | 12 | 21 | .21| 17 | 7  | 11 | 2  |
| S | 4  | 19 | 15 | 8  | 29 | 11 | 17 | —  | 12 | 21 | 21 | 17 | 7  | 11 | 2  |
| T | 3  | 14 | 15 | 45 | 29 | 11 | 17 | —  | 12 | 21 | 21 | 17 | 7  | 11 | 2  |
| A | 2  | 19 | 11 | 45 | 29 | 11 | 17 | —  | 12 | 21 | 21 | 17 | 7  | 11 | 2  |
|   | 1  | 15 | 15 | 45 | 29 | 17 | 17 | —  | 12 | 21 | 21 | 17 | 7  | 11 | 2  |
| DEVICE | | S1 | S2 | S3 | S4 | S5 | S6 | S7 | S8 | S9 | S10 | S11 | S12 | S13 | S14 |

GROUP - 1    SATELLITE or CHANNEL number
[F5]-Toggle page [F6]-Select GROUP [F7]-Change ET [F8]-Display other data The ET spreadsheet shows the watering times for each station, based on a particular ET value, which may be changed by using a function key [F7]. These are the adjusted watering times computed on a quantitative basis, from the ratio ETZ/Pz for each station. The spreadsheet also gives an estimate of the total volume of water that the whole system, not just the portions presently shown on the screen, would use in one day, again based on the selected ET value. It will be seen that the ET spreadsheet allows the operator to determine the effect of a particular ET value on all of the watering times in the system. The ET spreadsheet is used in conjunction with another available spreadsheet, the ET-ADJUST spreadsheet, which is shown in TABLE 3 below:

TABLE 3

FIELD DATABASE - station ET-ADJUST percentage (% ET)

|   |    |    |    |    |    |    |    |    |    |    |    |    |    |    |    |
|---|----|----|----|----|----|----|----|----|----|----|----|----|----|----|----|
|   | 12 | —  | —  | —  | —  | —  | —  | —  | —  | —  | —  | —  | —  | —  | A15 |
|   | 11 | —  | —  | —  | —  | —  | —  | —  | —  | —  | —  | —  | —  | —  | A15 |
| S | 10 | A1 | —  | 75 | —  | —  | —  | —  | —  | —  | —  | —  | —  | —  | A15 |
| A | 9  | A1 | —  | 75 | —  | 150| —  | —  | —  | —  | —  | —  | —  | —  | —  |
| T | 8  | A1 | —  | 75 | —  | —  | —  | —  | —  | —  | —  | —  | —  | —  | —  |
|   | 7  | A2 | 125| 75 | —  | A1 | —  | —  | —  | —  | —  | —  | —  | —  | —  |
|   | 6  | —  | —  | 75 | —  | A1 | —  | —  | —  | —  | —  | —  | —  | —  | —  |
|   | 5  | 90 | A2 | 75 | —  | A1 | —  | —  | —  | —  | —  | —  | —  | —  | —  |
| S | 4  | 90 | A2 | 75 | —  | —  | —  | —  | —  | —  | —  | —  | —  | —  | —  |
| T | 3  | 65 | A2 | 75 | —  | —  | —  | —  | —  | —  | —  | —  | —  | —  | —  |
| A | 2  | 90 | 65 | 75 | —  | —  | —  | —  | —  | —  | —  | —  | —  | —  | —  |
|   | 1  | A2 | A2 | 75 | —  | 150| —  | —  | —  | —  | —  | —  | —  | 95 | —  |
| DEVICE | | S1 | S2 | S3 | S4 | S5 | S6 | S7 | S8 | S9 | S10 | S11 | S12 | S13 | S14 |

|   | # | NAME | % of ET |
|---|----|------|---------|
| GROUP - 1    SATELLITE or CHANNEL number | A1 | GREENS | 125 |
|   | A2 | TEE1,2,3 | 85 |
|   | A3 | FWY1,2,3 | 75 |

[F3]-Scroll * [F4]*
[F5]-Toggle page [F6]-Select GROUP [F7]-Change data [F8]-Display other data The body of the table shows the ET-adjust factors. For example, if the system ET is 0.12, then the Et applied to channel 5, station 1 would be 0.18 (150% of 0.12). When an entry is blank, the adjust factor is taken as 100%, which means no adjustment is made. Entries beginning with the letter A refer to predefined ET-adjust zones. If many watering stations are expected to have the same ET-adjust factor, they may be put into a table, shown in the lower-right window in the ET-adjust table. The window shows only three lines at a time, but may be scrolled up or down to show the complete zone ET-adjust table.

By changing the ET-adjust factors and repeatedly going back to view the ET spreadsheet, the operator can produce a complete table of ET-adjust factors and can check the reasonableness of the factors from the resultant watering times provided by the ET spreadsheet. When the operator is satisfied with the ET-adjust factors, for even only a few stations in a watering schedule, these stations can be designated as operating under quantitative ET control. The mechanism for doing this will be discussed shortly.

The control system for the ET computer controller 10 is a "menu-driven" design. That is to say, functions to be performed are selected from a number of menus of functions arranged in levels of specificity. The operator begins use of the system from a main menu, from which one of a list of broad functions is selected, by typing in the number of a desired function selection. This leads to a sub-menu, from which a further function selection may be made. Return to the previous menu level is effected by means of the "escape" key on the keyboard. When a desired data display is presented on the operator's screen, functions to be performed on the data are effected by means of function keys on the keyboard, as described, for example, in relation to the ET spreadsheet.

For functions relating to ET control of the system, one of the items of the main menu leads to a submenu referred to as the ET schedule planner, shown below as TABLE 4:

TABLE 4

ET schedule planner - Push [#] of selection

| | |
|---|---|
| [1] - ET settings | Current ET = Man = .14 / 02-02-1987 |
| | Weather ET = Not Available |
| | Maximum ET = .34 |
| | Default ET = .1 |
| [2] - ET Spreadsheet | |
| [3] - Conversion Spereadsheet | |
| [4] - Database:ET-ADJUST factors | |
| [5] - Database:PRECIPitation rate | |
| [6] - Database:Device TYPE/GPM | |

Some of these menu functions have already been described, including the ET spreadsheet, the conversion spreadsheet and the ET-adjust spreadsheet. The databases for precipitation rates and device types and GPM (gallons per minute) do not normally need adjustment for ET control operation, unless there are equipment changes or sprinkler configuration changes in the field, but these databases are available for the operator in the event of such changes, and to allow checking for the presence of reasonable data.

The ET settings include the current ET, weather ET, maximum ET and default ET. The current ET is the value of ET currently being applied to the whole system, also known as the system ET. In the example shown in TABLE 4, the current ET is 0.14 and it was derived from the manual ET input on the date shown. The weather ET is the last known ET supplied from a weather station. If no weather station is available, this will be indicated on the screen. The maximum ET is a safety value input to the system by the operator to prevent overwatering in the event of an error in ET input. The default ET is a value that will be used as the system ET value when the current ET is supposed to be derived from the weather station but the weather station ET is not presently available. Selecting item 1 in ET schedule planner yields the following submenu, TABLE 5:

TABLE 5

ET settings

[1] - Set manual ET
[2] - Select weather station ET
[3] - Set maximum allowed ET
[4] - Set default ET The functions performed by these menu items are self-explanatory. They permit the various ET values to be changed as indicated. It will be noted that this menu effects system-wide changes to the ET. The reference ET (ETR) referred to earlier has been designed for use on separate schedules in the system, so that the operator can better focus on a schedule at a time when converting ET control operation. The ETR value for a schedule is entered at the time the schedule is entered into the system. An item on the main menu takes the operator through a series of questions and prompts to obtain the relevant information to define the schedule. This dialog with the operator is shown in TABLE 6 below:

TABLE 6

| | |
|---|---|
| Enter schedule NUMBER, then [Return] | 11 |
| Enter schedule NAME (up to 10 characters, then [Return] | SAND TRAPS |
| Do you want this schedule to be sensitized to ET (Y/N)? | Y |
| Enter typical application of water in inches (Ex: .12) | .15 |

If the schedule number is one of an already established schedule, the screen will provide a programming mode in which steps of a watering schedule may be entered or modified on the screen. If the schedule number is new to the system, the next three prompts will be displayed in turn, requiring the operator to enter the schedule name, to indicate whether the schedule is to be sensitized to ET and to enter a reference level for ET. These last two items, the ET "switch" and the ETR level, may also be entered for existing schedules, which will cause all of the programmed watering times, T(prog), to be adjusted at execution time in accordance with the relation $$T(adjust) = (ETR/ETZ) \times T(prog).$$

In the presently preferred embodiment of the invention, operation in the quantitative mode of ET control is controlled by the manner in which station timing steps are entered into a timing schedule. TABLE 7 shows the first few lines of a typical schedule as they would appear on the operator's screen.

TABLE 7

SCHED: 11   SANDTRAPS   AUTO   WB(%):E12   REPEATS:0   TOTAL RUN TIME: 29

1 START ON - Mon Tue Wed Thu Fri Sat Sun
2 START AT - 1050p
3 SATELLITE IDENTIFICATION - 01/17
4 Sat sta time - 07m29

STEP INSTRUCTION MENU

0 - COMMENT line
1 - SATELLITE ID
2 - Sat sta time
4 - TURN ON decoder
5 - TURN OFF decoder
7 - TIME
9 - PAUSE

TABLE 7-continued

| **********PROGRAMMING SCRATCHPAD********** | 10 - REPEAT LOOP |
| --- | --- |
| | 11 - LINK START |
| Enter instruction [#] from menu, then [RETURN] | 12 - LINK CANCEL |
| | 13 - LINK UN-INTR |
| [F5] - Set HELP level     [F6] - Change menu | 14 - LINK UN-INTR |
| [ESC] - Return to PROGRAMMING commands | 15 - LINK ADVANCE |

Lines Nos. 1-3 define the starting times for the schedule and identify the satellite controller on which the schedule runs Line No. 4 is a typical watering station timing instruction. Such a time is entered using the submenu shown as a window in this operator's screen display Item #2 in this step instruction menu provides a prompt for the operator to enter a timing instruction, which may have the general form:

*ssmtt,* where ss is the station number, m is a symbol indicating that the immediately following numeral quantity is in minutes, and tt designates the number of minutes that the station is to be maintained in the on condition. There are other variant forms of this timing step. Some examples are:

| 1m10,2m5 | - station 1 for 10 minutes, station 2 for 5 minutes, |
| --- | --- |
| 5-10m15 | - stations 5-10 for 15 minutes each, |
| 1m10,2m5,5-10m15 | - combination of above two steps. |

The other selections in the step instruction menu have no particular relevance for the ET control function claimed.

More importantly from the standpoint of the invention, there are two alternative forms of the timing instruction step. The operator may substitute either the letter X or the letter E for an absolute time in minutes. These codes have similar but significantly different effects on the operation of the system in ET control.

If the operator programs a station with the X code, e.g. 7 mX, the computer immediately computes a watering time in accordance with the formula ETR/Pz. This is equivalent to the amount of water that needs to be delivered by the station to satisfy the reference ET watering level. Thereafter, the programmed time derived in this manner is treated in the same way as any other absolute times entered into the schedule. In general, the operator would use this X time entry when creating a new schedule. The operator need only supply the reference ETR, and enter each of the station times as an X, and the computer will automatically replace the X's with absolute times derived from the ETR and the precipitation rates of the station valves. The schedule can then begin operating immediately, tracking with daily variations in the weather-derived ET level. Each time the schedule is executed, the programmed times, whether entered as absolute values or computed as a result of an X entry, are adjusted by the ratio ETZ/ETR. Subsequently, the operator may make necessary adjustments to the watering times of various stations, and the schedule continues to operate on a qualitative ET basis. This form of operation is a hybrid of the qualitative and quantitative modes. For those stations of which the times were entered as an X, and which were not subsequently changed, there is pure quantitative control, since the adjusted time is $$\begin{aligned} T(\text{adj}) &= (ETZ/ETR) \times T(\text{prog}) \\ &= (ETZ/ETR) \times (ETR/Pz) \\ &= (ETZ/Pz). \end{aligned}$$

However, for stations of which the times were entered as absolute values or were subsequently changed to a value not equal to (ETR/Pz), operation is still more properly designated qualitative ET control.

Complete quantitative control is achieved by using the letter E instead of a watering time in minutes in the watering schedule, e.g., 7 mE. The effect of the E symbol in the programming schedule is that no watering time is immediately computed. Instead the letter E is displayed in the schedule. At execution time, the adjusted watering time is computed from the usual formula: $T(\text{adj}) = ETZ/Pz$, and watering from that station is under complete quantitative control. In a schedule under complete quantitative control, all of the watering times would be designated as E in the schedule, and tuning adjustments of the schedule would be made solely in the ET-ADJUST database.

A feature of the programming screen not shown in TABLE 7 is that it permits entry of different ET values and computes what the actual watering times will be for the designated ET value. This ET value, and the computed watering times, are solely for simulation purposes, and have no effect on the current ET being used for watering by the system, and no effect on the actual watering times of the schedule. For example, the operator may be aware that the weather ET may go as high as 0.22 inches per day, and may wish to observe the effect of this ET on a particular operating schedule. Alternatively, the operator may want to observe the effect of the predefined maximum ET on the watering schedule.

Cycle-and-soak operation

Another important feature of the invention also relates to the manner in which a station watering time is designated. As noted earlier, the simplest form is ssmtt, meaning that station ss is to be on for tt minutes. In accordance with this aspect of the invention, the total watering time tt for any station may be specified as being subject to "cycle and soak" operation, which means that continuous watering at the station will not exceed a maximum "cycle time" $t_c t_c$ and that the watering cycles will be separated by at least a minimum "soak time" $t_s t_s$. As will be explained, the cycle times and soak times are stored in a separate data base, usually only once, and from then on the operator need only specify a total watering time. The total specified time will be broken up into cycles automatically by the control system of the invention.

This feature is designed to address a common problem encountered in irrigation systems. For reasons not easily programmed into a completely automatic ET control system, some irrigated areas simply cannot accept, all at once, all of the water needed replace the lost moisture determined by the ET formula. If the terrain is steeply sloping, or the topsoil is thin, much of the applied water will run off. In the past, this difficulty has been addressed by two techniques. One is to program a schedule to have shorter watering times but to repeat the schedule more often in the day. This, of course, affects all of the stations on the schedule, some of them unnecessarily. The other approach is to program a PAUSE instruction in the schedule, such that the schedule is suspended for a designated number of minutes, and then applies another watering step at the same station. This has the disadvantage that the entire schedule is suspended, often unnecessarily.

In accordance with the invention, a station programmed to water in the "cycle" mode, will initially be on for only the time $t_c t_c$. After one such watering, the system continues executing other schedule steps, turning other stations on and off as required. Subsequently, the system checks to determine for any stations that are still active because their total watering time has not been used. The station operating in the "cycle" mode will be again turned on if its minimum soak time has elapsed, and the process will continue until all stations have been turned on for the requisite times. The specified total watering time does not have to be an integral multiple of the cycle time. If it is not, the last watering cycle will simply be adjusted to a shorter time until all of the total watering time is depleted.

The cycle and soak feature was defined in the cross-referenced application as being implemented as an alternative form of a station timing instruction step. If the operator wished to designate a station as being subject to cycle and soak operation, he would specify the cycle time and the soak time in this special form of the timing instruction step for that particular station. Although this was satisfactory, a more consistent approach, disclosed in this specification, uses two additional databases to define the cycle and soak times A station cycle time database contains for each of its entries the maximum cycle time (watering time) permitted for each station or group of stations. An example of a station cycle time database is shown in TABLE 8. A station soak time database similarly provides the minimum soak time required between consecutive waterings for each station or group of stations. An example of a station soak time database is shown in TABLE 9. If these database entries are left undefined for any station or stations, the stations will simply operate with single, uninterrupted watering times.

TABLE 8

| | | | FIELD DATABASE - station CYCLE times in minutes | | | | | | | | | | | | |
|---|---|---|---|---|---|---|---|---|---|---|---|---|---|---|---|
| | | 12 | 6 | — | — | — | — | 5 | — | — | — | — | — | 5 | — | — |
| | | 11 | 6 | — | — | — | — | 5 | — | — | 7 | — | — | 5 | — | — |
| S | | 10 | 6 | — | — | — | — | 5 | — | — | 7 | — | — | — | — | — |
| A | | 9 | 6 | — | — | 6 | — | 5 | — | — | 7 | — | — | — | — | — |
| T | | 8 | 8 | — | — | 6 | — | 5 | — | — | 7 | — | — | — | — | — |
| | | 7 | 8 | — | — | 6 | — | — | — | — | 7 | — | — | — | — | — |
| | | 6 | 8 | — | — | 6 | — | — | — | — | 7 | — | — | 8 | — | — |
| | | 5 | 8 | — | — | 6 | — | — | — | — | 7 | — | — | 8 | — | — |
| S | | 4 | 5 | — | — | 6 | — | — | — | — | 7 | — | — | 8 | — | — |
| T | | 3 | 5 | — | — | 6 | — | — | — | — | — | — | — | 8 | — | — |
| A | | 2 | 5 | — | — | — | — | — | — | — | — | — | — | 8 | — | — |
| | | 1 | 5 | — | — | — | — | — | — | — | — | — | — | 8 | — | — |
| DEVICE | | | S 1 | S 2 | S 3 | S 4 | S 5 | S 6 | S 7 | S 8 | S 9 | S 10 | S 11 | S 12 | S 13 | S 14 |
| GROUP - 1 | | | | | | | SATELLITE or CHANNEL number | | | | | | | | | |
| [F5]-page [F6]-Group [F7]-Change data [F8]-Display other data | | | | | | | | | | | | | | | | |

TABLE 9

| | | | FIELD DATABASE - station SOAK times in minutes | | | | | | | | | | | | |
|---|---|---|---|---|---|---|---|---|---|---|---|---|---|---|---|
| | | 12 | — | — | — | — | — | 22 | — | — | — | — | — | 22 | — | — |
| | | 11 | — | — | — | — | — | 22 | — | — | 24 | — | — | 22 | — | — |
| S | | 10 | — | — | — | — | — | 22 | — | — | 14 | — | — | — | — | — |
| A | | 9 | — | — | — | 15 | — | 22 | — | — | 14 | — | — | — | — | — |
| T | | 8 | — | — | — | 15 | — | 22 | — | — | 14 | — | — | — | — | — |
| | | 7 | — | — | — | 15 | — | — | — | — | 12 | — | — | — | — | — |
| | | 6 | — | — | — | 15 | — | — | — | — | 12 | — | — | 18 | — | — |
| | | 5 | 25 | — | — | 15 | — | — | — | — | 12 | — | — | 18 | — | — |
| S | | 4 | 10 | — | — | 15 | — | — | — | — | 12 | — | — | 18 | — | — |
| T | | 3 | 10 | — | — | 15 | — | — | — | — | — | — | — | 18 | — | — |
| A | | 2 | 10 | — | — | — | — | — | — | — | — | — | — | 18 | — | — |
| | | 1 | 10 | — | — | — | — | — | — | — | — | — | — | 18 | — | — |
| DEVICE | | | S 1 | S 2 | S 3 | S 4 | S 5 | S 6 | S 7 | S 8 | S 9 | S 10 | S 11 | S 12 | S 13 | S 14 |
| GROUP - 1 | | | | | | | SATELLITE or CHANNEL number | | | | | | | | | |
| [F5]-page [F6]-Group [F7]-Change data [F8]-Display other data | | | | | | | | | | | | | | | | |

Flow Manager

Figure 3:
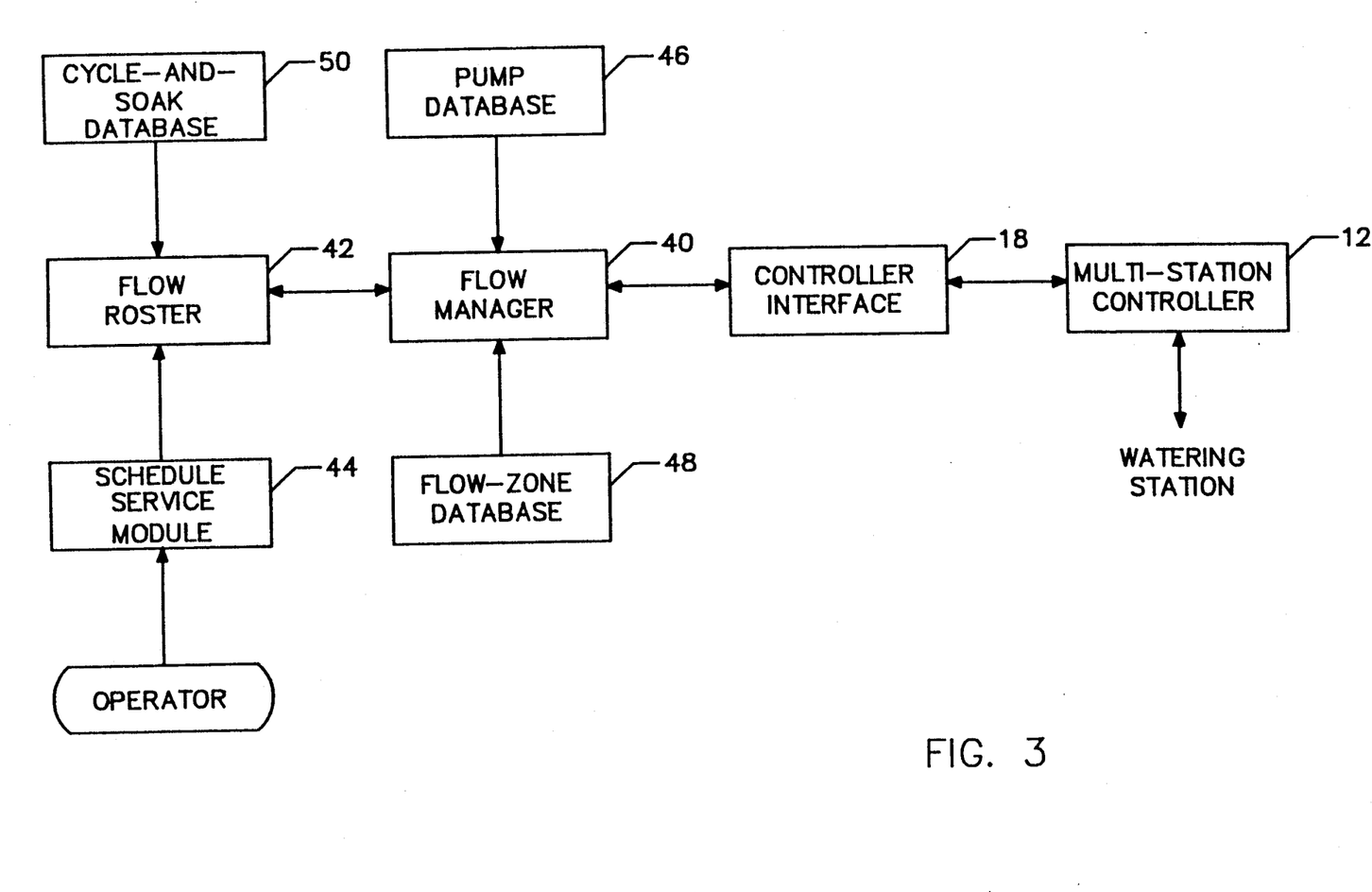
FIG. 3 is a simplified block diagram showing the information flow between a flow manager and other components of the system.
Figure 4:
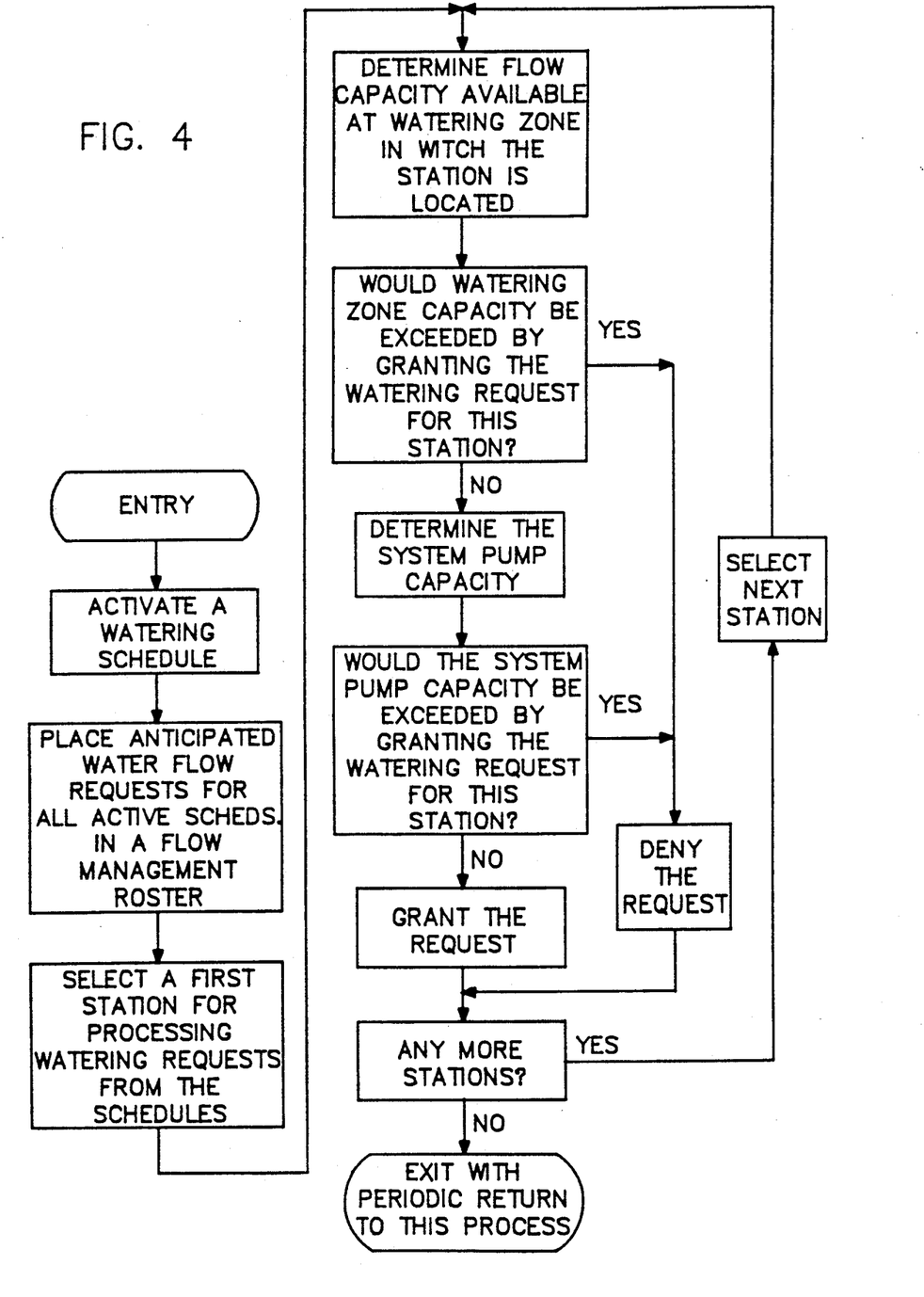
FIG. 4 is a flowchart illustrating the basic functions performed in accordance with the method of the invention.

The present invention also uses a "flow manager" to control operation of pumps that supply water to the irrigation system, consistent with the known capacities of the pumps and with known or estimated limitations of the water distribution network. FIG. 3 shows diagrammatically how the flow manager 40 interacts with other components of the system. A central feature of the system is a flow roster 42, which is used to record all requests for water flow. As will be described in more detail, the flow roster has a storage cell for every watering station in the system, and these cells contain the accumulated requested watering times for the stations, from all sources. A schedule service module 44 determines which schedules are active, as a result of being automatically or manually turned on, and posts appropriate requests to the flow roster for all of the steps of each active schedule. In this mode of operation, the schedules are not sequential in nature. All steps of an active schedule are treated alike and result in requests being made to the flow roster 40.

While the schedule service module 44 controls the flow of request information fed into the flow roster 42, the flow manager 40 controls the flow of information out of the flow roster. In simple terms, the flow manager 40 continually scans through the flow roster 42 and initiates watering times based on priorities assigned to the various requesting schedules, and on the availability of system pump capacity and flow capacity in localized flow zones in the system. For this purpose, the flow manager 40 interacts with data in a pump database 46 and a field flow-zone database 48. In addition, the flow manager 40 uses information from the cycle-and soak database 50, to modify the flow roster 42 appropriately when handling a station that is subject to the cycle-and-soak feature. When the flow manager 40 grants a request for watering time for a particular station, communication is made to the controller interface 18, which is in turn connected to a multi-valve irrigation controller 12. The flow manager 40 also receives feedback information from the controller interface 18, to indicate whether a watering command has been successfully executed or not.

The pump database 46 defines a sequence of incremental steps of available pump capacity, as shown by way of example in TABLE 10. The flow manager uses information in this database to decide whether or not to grant additional requests for watering, as posted in the flow roster. The goal is to provide, as far as possible, a smooth and relatively flat pump demand characteristic, without running any pump with too light a load, and without sudden changes in demand. When the system is first started, only the first incremental pump capacity step is available, which is specified as 150 gallons per minute (gpm). Requests up to this total flow rate are granted, assuming other conditions are met, but no additional requests are granted until the accumulated total of requested and already granted flows exceeds a specified "overload" level, shown as 250 gpm for the first step. Thus, the next pump capacity increment will not be used until the requested and granted flow total reaches 250 gpm, at which time the second incremental step will bring the total pump capacity to 300 gpm. Additional requests can then be granted up to the 300 gpm level, but then no further requests will be granted until the accumulated requests and already granted (and still running) flows reach the next specified overload level of 350 gpm.

Another smoothing influence on the rate at which the pump steps are reached is the "step delay" parameter also specified for each step. This is a minimum time in minutes that must be spent on any step before advancing to the next step. Therefore, if a total flow rate of 250 gpm requested and granted flows is reached on the first step, there will still be no advancement to the second step until four minutes have elapsed. The end of the table is indicated by a zero value in the step size position. A zero may be inserted at any point in the table to artificially limit the total capacity of the system for some reason, such as when pumps are temporarily out of service.

Pump capacity is one of two principal criteria used by the flow manager to determine whether to grant or deny a request made in the flow roster. The second criterion is flow-zone capacity. If the flow manager were to grant requests without regard to the effects on local flow conditions, it is quite conceivable that unacceptably large flows could result in a particular section of the water distribution system, and that water pressures and actual flow rates would be diminished. The flow capacity of each distribution line is usually known from design parameters, or can be estimated with reasonable accuracy, and later adjusted as dictated by experience. In accordance with this aspect of the invention, every watering station is assigned to a "flow zone," usually in the same physical area and connected to a common distribution line. A flow-zone database defines which stations are assigned to the flow zones, and further defines the maximum flow permitted in each flow zone. TABLES 11 and 12 together provide an example of a flow-zone database. In processing requests for flow, the flow manager simply denies a new request if it would increase the total zone flow above the maximum provided in the flow-zone database.

TABLE 10

| # | Pump Step Capacity table (gpm) | | | |
|---|---|---|---|---|
| | Step size | Capacity | Overload | Step delay (minutes) |
| 1 | 150 | 150 | 250 | 4 |
| 2 | 150 | 300 | 300 | 3 |
| 3 | 100 | 400 | 500 | 2 |
| 4 | 150 | 550 | 550 | 4 |
| 5 | 150 | 700 | 750 | 3 |
| 6 | 100 | 800 | 900 | 2 |
| 7 | 150 | 950 | 1050 | 4 |
| 8 | 175 | 1125 | 1350 | 3 |
| 9 | 175 | 1300 | 1450 | 2 |
| 10 | 150 | 1450 | 1550 | 4 |
| 11 | 150 | 1600 | 1650 | 3 |
| 12 | 100 | 1700 | 1750 | 2 |
| 13 | 100 | 1800 | 9999 | 2 |

Total = 1800
{F7} - Change step data

TABLE 11

| | | | System Flow Zone Table | | | | | | | |
|---|---|---|---|---|---|---|---|---|---|---|
| F# | NAME | GPM | F# | NAME | GPM | F# | NAME | GPM | F# | NAME | GPM |
| 1 | HOLE # 1 | 250 | 16 | HOLE #16 | 250 | 31 | | 0 | 46 | | 0 |
| 2 | HOLE # 2 | 350 | 17 | HOLE #17 | 250 | 32 | | 0 | 47 | | 0 |
| 3 | HOLE # 3 | 250 | 18 | HOLE #18 | 325 | 33 | | 0 | 48 | | 0 |
| 4 | HOLE # 4 | 175 | 19 | | 0 | 34 | | 0 | 49 | | 0 |
| 5 | HOLE # 5 | 250 | 20 | HOLE 1-G | 250 | 35 | | 0 | 50 | | 0 |
| 6 | HOLE # 6 | 300 | 21 | HOLE 18-G | 500 | 36 | | 0 | 51 | | 0 |
| 7 | HOLE # 7 | 250 | 22 | | 0 | 37 | | 0 | 52 | | 0 |
| 8 | HOLE # 7 | 400 | 23 | | 0 | 37 | | 0 | 53 | | 0 |
| 9 | HOLE # 7 | 250 | 24 | | 0 | 37 | | 0 | 54 | | 0 |

TABLE 11-continued

System Flow Zone Table

| F# | NAME | GPM | F# | NAME | GPM | F# | NAME | GPM | F# | NAME | GPM |
| --- | --- | --- | --- | --- | --- | --- | --- | --- | --- | --- | --- |
| 10 | HOLE # 7 | 275 | 25 | | 0 | 37 | | 0 | 55 | | 0 |
| 11 | HOLE # 7 | 375 | 26 | | 0 | 37 | | 0 | 56 | | 0 |
| 12 | HOLE # 7 | 425 | 27 | | 0 | 37 | | 0 | 57 | | 0 |
| 13 | HOLE # 7 | 250 | 28 | | 0 | 37 | | 0 | 58 | | 0 |
| 14 | HOLE # 7 | 250 | 29 | | 0 | 37 | | 0 | 59 | | 0 |
| 15 | HOLE # 7 | 190 | 30 | | 0 | 37 | | 0 | 60 | | 0 |

[F7] - Change /Add data [F8] - Block change

TABLE 12

FIELD DATABASE - station FLOW ZONE assignments

|   | 12 | F1 | F1 | F3 | F3 | F4 | F4 | F4 | F5 | F5 | F5 | F6 | F6 | F8 | F8 |
| --- | --- | --- | --- | --- | --- | --- | --- | --- | --- | --- | --- | --- | --- | --- | --- |
|   | 11 | F1 | F1 | F3 | F3 | F4 | F4 | F4 | F5 | F5 | F5 | F6 | F6 | F8 | F8 |
| S | 10 | F1 | F1 | F3 | F3 | F4 | F4 | F4 | F5 | F5 | F5 | F6 | F6 | F8 | F8 |
| A | 9 | F1 | F1 | F3 | F3 | F4 | F4 | F4 | F5 | F5 | F5 | F6 | F6 | F8 | F8 |
| T | 8 | F1 | F1 | F3 | F3 | F4 | F4 | F4 | F5 | F5 | F5 | F6 | F6 | F8 | F8 |
|   | 7 | F1 | F1 | F3 | F3 | F4 | F4 | F4 | F5 | F5 | F5 | F6 | F6 | F8 | F8 |
|   | 6 | F1 | F1 | F3 | F3 | F4 | F4 | F4 | F5 | F5 | F5 | F6 | F6 | F8 | F8 |
|   | 5 | F1 | F1 | F3 | F3 | F4 | F4 | F4 | F5 | F5 | F5 | F6 | F6 | F8 | F8 |
| S | 4 | F1 | F1 | F3 | F3 | F4 | F4 | F4 | F5 | F5 | F5 | F6 | F6 | F8 | F8 |
| T | 3 | F1 | F1 | F3 | F3 | F4 | F4 | F4 | F5 | F5 | F5 | F6 | F6 | F8 | F8 |
| A | 2 | F1 | F1 | F3 | F3 | F4 | F4 | F4 | F5 | F5 | F5 | F6 | F6 | F8 | F8 |
|   | 1 | F1 | F1 | F3 | F3 | F4 | F4 | F4 | F5 | F5 | F5 | F6 | F6 | F8 | F8 |
| DEVICE |   | S1 | S2 | S3 | S4 | S5 | S6 | S7 | S8 | S9 | S10 | S11 | S12 | S13 | S14 |

GROUP - 1    SATELLITE or CHANNEL number

[F5]-page [F6]-Group [F7]-Change data [F8]-Display other data

In prior forms of this irrigation system, such as the one disclosed in the cross-referenced application, execution of an irrigation schedule proceeded on a step-by-step basis. That is to say, each entry or instruction in a schedule would specify a watering operation on a particular station, and this operation would be carried out to completion before inspecting the next entry in the schedule and executing it in sequence. In the presently contemplated form of the invention, two modes of schedule execution are possible. In S-mode, or step-by-step mode, the instructions are executed in the same manner as before. However, to effect execution in this mode, a priority 'S' must be designated for the schedule or group of schedules. The other mode of execution is priority execution under control of the flow manager. In this case, a priority of between 1 and 5, 1 being the highest priority, must be assigned to each schedule or group of schedules.

Once the schedule priorities and the pump capacities have been defined, initiation of operation under the flow manager is extremely simple. Instead of having to provide schedule starting times for all of the watering schedules, the operator merely starts all the schedules at some convenient time. This can be done by assigning the same start time to each schedule, or by employing a single master schedule that will "linkstart" all of the schedules practically together. The time of starting the schedules will usually be determined by the needs of a particular application. In the case of a golf course, for example, the goal is usually to complete all watering in the hours of darkness, and all the schedules could be started shortly after sunset. In a conventional irrigation control system, the simultaneous starting of all of the watering schedules would result in hydraulically overloading the system. The total pump capacity would quickly be exceeded and many of the watering stations would receive sufficient water. In the case of the present invention, however, the flow manger immediately comes into operation and regulates the actual watering times to conform with system pump capacity and the limitations of the water distribution network.

An important new feature of the system for implementation of flow management is the flow manager roster, an example of which is shown in TABLE 11. As will be observed, the roster is formatted in much the same way as databases in the system. Initially, the system scans the active schedules and extracts from them the priority and watering time of every station for which watering is scheduled. This priority and watering time or run time information is placed in the flow manager roster. Then, as each station is operated, the associated run time is removed from the roster and posted to another location at the bottom of the roster. This currently running station is displayed, together with the remaining run time for the station.

To facilitate a further description of operation of the flow manager, TABLE 14 shows the internal structure of the flow roster for a single multi-station controller. The complete flow roster has a structure like the one shown for every controller in the system. As will become apparent as the description proceeds, although each such controller has multiple watering stations, only one station may be actively watering at any point in time.

TABLE 13

MAXI - Flo Manager - Pumps: Cap = 1800 Demand = 3746 Flow = 1792                                            8:04:00 Pm
FLO - Roster Priority/Station run time

|   |    |   |      |      |      |      |   |      |      |   |      |      |      |      |      |      |
| --- | --- | --- | --- | --- | --- | --- | --- | --- | --- | --- | --- | --- | --- | --- | --- | --- |
|   | 12 | — | —    | 3/28 | —    | —    | 4/12 | 5/27 | —    | 4/28 | 5/12 | 3/27 | —    | —    | 4/31 |
|   | 11 | — | 4/12 | 3/28 | 4/28 | —    | 4/12 | 5/27 | —    | 4/27 | 5/12 | 3/31 | 4/12 | 3/48 | 4/28 |
| S | 10 | — | 4/48 | 3/27 | 4/28 | 3/27 | 4/48 | 5/28 | —    | 4/27 | 5/27 | 3/28 | —    | 3/12 | 4/27 |
| A | 9  | — | 4/12 | 3/27 | 4/27 | 3/28 | 4/12 | 5/28 | —    | 4/27 | 5/28 | 3/27 | 4/27 | 3/28 | 4/28 |

TABLE 13-continued

MAXI - Flo Manager - Pumps: Cap = 1800 Demand = 3746 Flow = 1792        8:04:00 Pm
FLO - Roster Priority/Station run time

|   |   |   |      |       |      |      |      |      |      |      |      |      |      |      |      |
|---|---|---|------|-------|------|------|------|------|------|------|------|------|------|------|------|
| T | 8 | — | 4/27 | 3/28  | 4/27 | 3/28 | 4/27 | 5/28 | —    | 4/28 | 5/28 | 3/27 | 4/27 | 3/28 | 4/27 |
|   | 7 | — | 4/27 | 3/28  | 4/27 | 3/27 | 4/27 | 5/28 | 3/27 | 4/28 | 5/27 | 3/27 | 4/28 | 3/28 | 4/27 |
|   | 6 | — | 4/28 | 3/27  | 4/27 | 3/27 | 4/28 | 5/27 | 3/27 | 4/27 | 5/27 | 3/27 | 4/27 | 3/27 | 4/27 |
|   | 5 | — | 4/28 | 3/27  | 4/27 | 3/27 | 4/28 | 5/27 | 3/27 | 4/28 | 5/28 | —    | 4/28 | 3/27 | 4/27 |
| S | 4 | — | 4/26 | 3/27  | 4/28 | 3/27 | 4/27 | 5/28 | 3/27 | 4/28 | 5/27 | —    | 4/27 | —    | 4/27 |
| T | 3 | — | 4/27 | 3/27  | 4/28 | —    | 4/27 | 5/27 | 3/27 | 4/27 | 5/27 | 3/27 | 4/27 | 3/28 | 4/28 |
| A | 2 | — | 4/27 | —     | 4/27 | 3/28 | 4/28 | 5/28 | —    | 4/27 | 5/27 | 3/31 | 4/12 | 3/27 | 4/27 |
|   | 1 | — | 4/27 | —     | 4/27 | —    | 4/28 | 5/27 | —    | 4/28 | 5/27 | 3/27 | 4/48 | —    | 4/27 |

| DEVICE | S | S    | S     | S    | S | S | S    | S | S | S    | S    | S    | S |
|--------|---|------|-------|------|---|---|------|---|---|------|------|------|---|
| ST/T   |   | 2/17 | 12/10 | 3/16 |   |   | 2/21 |   |   | 5/21 | 10/2 | 1/22 |   |
|        | 1 | 2    | 3     | 4    | 5 | 6 | 7    | 8 | 9 | 10   | 11   | 12   | 13 | 14 |

GROUP - 1                              SATELLITE or CHANNEL number
[F5]-page [F6]-Group [F7]-Change data [F8]-Display other data

TABLE 14

| Location | Contains | Remarks |
|----------|----------|---------|
| 0 | Status | See below for possible values |
| 1 | Flowzone | (of active station) |
| 2 | Priority/time | (of active station) |
| 3 | Flow (gpm) | (of active station) |
| 4 | Station # | (of active station) |
| 5 | Schedule # | (of active station) |
| 6 | Stn 1 time | (stored as 100*priority + time) |
| 7 | Stn 2 time | (stored as 100*priority + time) |
| . | . | ...... |
| . | . | ...... |
| 29 | Stn 24 time | (stored as 100*priority + time) |

| Status value | Meaning |
|--------------|---------|
| 0 | Inactive (no requests) |
| 1 | Request posted to roster |
| 2 | Requested processed by flow manager |
| 3 | Command issued to controller interface |
| 4 | Acknowledge (one minute since command) |
| 5 | Acknowledge (two minutes since command) |
| 10 | Request to advance to next station |
| >100 | Actively timing a station; time remaining is (status value - 100) |

When the schedule service module 44 (FIG. 3) posts requests to the flow roster 42, requested flow rates and corresponding priority values, from 1 to 5, are stored in the appropriate locations of the flow roster, beginning at location #6 for the first station, location #7 for the second station, and so forth. As noted in TABLE 14, each station time and priority are stored by multiplying the priority by 100 and adding the time in minutes. For example, a priority of 1 and a time of 40 minutes are stored as 140.

In addition to the databases already mentioned, the flow manager also employs an internal flow-zone work array to keep track of the flow by zone. There is an entry in the array for every flow zone in the system, up to 60 in the present embodiment. Each entry in the array has four flow rate items in addition to a flow zone number. These are the flow capacity of the zone, the available flow rate for the zone, the anticipated flow for the zone, and the flow rate actually running in the zone.

The flow manager performs operations on the flow roster in a repetitive fashion. It first makes a survey pass during which all of the zone flows and total system flows are recalculated. The individual zone running flows are cleared to zero, as are the total system running and requested flows. Then, the flow roster is scanned, through all of the multi-station controllers and groups of controllers, to locate any controllers for which requests have already been granted, indicated by a status word of 3 or 4, or 100 or more. For each controller located in this category, the zone running flow is updated, as is the system running flow.

Also during each survey pass that coincides with a minute timer count, for any active controllers (indicated by a status word with a value over 100), the timer count in the status word is decremented by one minute. If the countdown is completed, a special status value of 10 is placed in the status word to trigger advancement to another station. Further, if the status value reaches 5 it is assumed that a previously initiated operation was unsuccessful after a two-minute wait, and appropriate steps are taken to advance to another station and to adjust the zone running flow and the total system running flow.

The zone available flows are next computed by subtracting the zone running flow from the zone capacity flow, for each flow zone. At this point, the running and anticipated flow rates are known and the flowzone available flow rates have been recalculated. In the next phase of operation of the flow manager, a request survey is taken, to determine the system demand.

In the request survey, the flow roster is scanned in order of priority, looking first for first priority requests, then second priority, and so forth. Within each priority, the roster is scanned by controller and controller group, searching for status words indicating that a request has been posted or that a station advance request has been made. For each new request, two test must be passed before the request is actually made for output to the controller interface. First, the additional flow associated by the request must meet the flow-zone limitations, as explained earlier. And second, the additional flow must meet the pump step limitations as to capacity and delay time. If both tests are passed, the flow manager communicates with the controller interface to initiate the new watering operation. If the operation cannot be initiated, it remains in the flow roster as an unsatisfied flow request. It will remain unsatisfied until the reason for denial of the request is no longer present, either because of an increase in the available zone flow rate, or because the system has moved up by an incremental pump capacity step.

Cycle-and-soak under flow manager

Cycle-and-soak operations are handled with only slight differences by the flow manager. Initially, the schedule serving module posts a request to the flow roster for a requested total watering time. If cycle-and-soak operation is required for a particular station, there will be appropriate entries for cycle time and soak time in the cycle database and the soak data-base. At the point where the flow manager is about to execute a command to initiate watering at the station, a check is made to determine whether a cycle time has been specified for the station. If none is specified, the total watering time is used in the command. If a cycle time is specified, the cycle time is used in the watering command and is stored as the current station run time in the flow roster entry for this particular controller. At the same time, the station run time, stored in location #(5 +station #), is reduced by one cycle time to indicate that one watering cycle has been processed. At the start of subsequent watering cycles, this stored time will be reduced by one cycle time, until the last watering cycle clears it to zero.

The current station run time for a controller is counted down by one every minute. This is one of the functions of the survey pass described earlier. The count, it will be recalled, is stored in the status word as (100 +time remaining). When the count has been counted down to zero, the status word is set to a value of 10 to force advancement to another station. One of the effects of a status word of 10 is to cause the flow manager to set a soak time for a station that has just finished timing. The soak time is obtained from the soak database, which may contain a zero value for the station or may contain a real soak time. The value is placed in a soak roster, an example of which is shown in TABLE 15. Nonzero values in the soak roster are counted down every minute during the survey pass of the flow manager. Once the soak time for a particular station has elapsed, the controller status is changed to active if it is not already active with other station activities, and another watering cycle may be started for the station at which soaking is complete.

It will be appreciated from the foregoing that the present invention provides a significant advance in the field of irrigation control systems. In particular, the system of the invention is a departure from traditional control systems in which schedules of instructions are executed to turn water on at a specified sequence of stations. The sequencing of operations at all of the stations is controlled entirely automatically under the dual limitations of pump capacity and flow-zone values. The flow manager of the invention operates the watering stations in a highly efficient manner, distributing exactly the specified amounts of water, but smoothing the pump usage and staying below specified flow-zone limitations. When combined with ET operation and the cycle-and-soak feature, the invention provides a fully automatic irrigation system that compensates precisely for weather changes, local drainage conditions, pump capacity changes, and limitations in zone water flow.

TABLE 15

| MAXI - Flo Manager - Pumps: Cap = 1800 Demand = 3746 Flow = 1792 8:04:00 Pm |
|---|
| SOAK - Roster Station Soak Times remaining |

|   |    | S1 | S2 | S3 | S4 | S5 | S6 | S7 | S8 | S9 | S10 | S11 | S12 | S13 | S14 |
|---|----|----|----|----|----|----|----|----|----|----|-----|-----|-----|-----|-----|
|   | 12 | —  | —  | —  | —  | —  | —  | —  | —  | —  | —   | —   | —   | —   | —   |
|   | 11 | —  | —  | —  | —  | —  | —  | —  | —  | —  | —   | —   | —   | —   | —   |
| S | 10 | —  | —  | —  | —  | —  | —  | —  | —  | —  | —   | —   | —   | —   | —   |
| A | 9  | —  | —  | —  | —  | —  | —  | —  | —  | 14 | —   | —   | —   | —   | —   |
| T | 8  | —  | —  | —  | —  | —  | 7  | —  | —  | —  | —   | —   | —   | —   | —   |
|   | 7  | —  | —  | —  | —  | —  | —  | —  | —  | 5  | —   | —   | —   | —   | —   |
|   | 6  | —  | —  | —  | —  | —  | —  | —  | —  | —  | —   | —   | —   | —   | —   |
|   | 5  | —  | —  | —  | —  | —  | —  | —  | —  | —  | —   | —   | —   | —   | —   |
| S | 4  | —  | —  | —  | —  | —  | —  | —  | —  | —  | —   | —   | —   | —   | —   |
| T | 3  | —  | —  | —  | —  | —  | —  | —  | —  | —  | —   | —   | —   | —   | —   |
| A | 2  | —  | —  | —  | —  | —  | —  | —  | —  | —  | —   | —   | —   | —   | —   |
|   | 1  | —  | —  | —  | —  | —  | —  | —  | —  | —  | —   | —   | —   | —   | —   |
| DEVICE | | S1 | S2 | S3 | S4 | S5 | S6 | S7 | S8 | S9 | S10 | S11 | S12 | S13 | S14 |

| GROUP - 1 | SATELLITE or CHANNEL number |
|---|---|
| [F5]-page [F6]-Group [F7]-Change data [F8]-Display other data | |

It will also be appreciated that, although an embodiment of the invention has been described in detail for purposes of illustration, various modifications may be made without departing from the spirit and scope of the invention. Accordingly, the invention is not to be limited except as by the appended claims.

Various implementations of the invention are possible, and the present embodiment has been reduced to practice in the form of software in the BASIC programming language for execution on computers of the IBM PC type. A complete listing of the software is provided by way of completeness in Appendix A to this specification. The flow manager is contained in a section labeled FLWMGR.SRC.

Appendex A is part of the patent file wrapper.

I claim:

1. A method of controlling an irrigation control system in accordance with available pump capacity and local flow constraints, the method comprising the steps of:

activating at least one watering schedule having a plurality of programmed watering times for a plurality of stations;

placing the anticipated water flow requests for all active schedules in a flow management roster; and processing the requests for watering on a priority basis, including granting requests for watering at specific stations, based on availability of pump capacity and maintaining flow in local zones below designated maxima, and updating the flow management roster as watering continues, to reflect the passage of time and the current total flow conditions;

and wherein the step of granting requests for watering at specific stations includes determining the flow capacity presently available in a predefined watering zone in which each station is located;

denying the request if granting it would exceed the zone capacity for water flow;

determining the current pump capacity of the irrigation system, the currently running flow rate in the system, and the currently requested additional flows; and denying the request if the currently requested flows in the system are insufficient to justify incrementally expanding the current pump capacity of the system.

2. A method as defined in claim 1, wherein the step of granting requests also includes:

comparing the total of currently running and currently requested flow rates with a maximum overload flow rate associated with each incremental step in pump capacity; and expanding the pump capacity by one increment if the compared total is greater than the overload flow rate, and granting any requests contributing to the total of currently requested flow rates.

3. A method as defined in claim 2, wherein the step of granting requests also includes:

delaying expansion to a new pump capacity increment if the current incremental level has been in effect less than a time limit previously defined for each incremental level.

4. A method of controlling an irrigation control system in accordance with available pump capacity and local flow constraints, the method comprising the steps of:

defining the watering times for a plurality of irrigation stations;

placing the defined watering times as flow requests in a flow management roster; and processing the flow requests, including granting requests based on availability of pump capacity and maintaining flow in local zones below designated maxima, and updating the flow management roster as watering continues, to reflect the passage of time and the current total flow conditions;

and wherein the step of granting requests includes determining the flow capacity presently available in a predefined watering zone in which each station is located;

denying the request if granting it would exceed the zone capacity for water flow;

determining the current pump capacity of the irrigation system, the currently running flow rate in the system, and the currently requested additional flows; and denying the request if the currently requested flows in the system are insufficient to justify incrementally expanding the current pump capacity of the system.

5. A method as defined in claim 4, wherein the step of granting requests also includes:

comparing the total of currently running and currently requested flow rates with a maximum overload flow rate associated with each incremental step in pump capacity; and expanding the pump capacity by one increment if the compared total is greater than the overload flow rate, and granting any requests contributing to the total of currently requested flow rates.

6. A method as defined in claim 5, wherein the step of granting requests also includes:

delaying expansion to a new pump capacity increment if the current incremental level has been in effect less than a time limit previously defined for each incremental level.

7. A method as defined in claim 4, wherein:

the method further comprises the step of defining maximum cycle times and minimum soak times for selected stations; and the step of processing the flow requests includes splitting the requests for the selected stations into multiple cycle requests separated by soak times.

8. Apparatus for controlling an irrigation control system in accordance with available pump capacity and local flow constraints, the apparatus comprising:

means for defining the watering times for a plurality of irrigation stations;

means for placing the defined water times as flow requests in a flow management roster; and means for processing the flow requests, including means for granting requests based on availability of pump capacity and maintaining flow in local zones below designated maxima, and means for updating the flow management roster as watering continues, to reflect the passage of time and the current total flow conditions;

and wherein the means for granting requests includes means for determining the flow capacity presently available in a predefined watering zone in which each station is located;

means for denying the request if granting it would exceed the zone capacity for water flow;

means for determining the current pump capacity of the irrigation system, the currently running flow rate in the system, and the currently requested additional flows; and means for denying the request if the currently requested flows in the system are insufficient to justify incrementally expanding the current pump capacity of the system.

9. An apparatus as defined in claim 8, wherein:

the apparatus further comprises means for defining maximum cycle times and minimum soak times for selected stations; and the means for processing the flow requests includes means for splitting the requests for the selected stations into multiple cycle requests separated by soak times.

10. Apparatus for controlling an irrigation control system in accordance with available pump capacity and local flow constraints, the apparatus comprising:

means for defining the watering times for a plurality of irrigation stations;

means for placing the defined watering times as flow requests in a flow management roster; and means for processing the flow requests, including means for granting requests based on availability of pump capacity and maintaining flow in local zones below designated maxima, and means for updating the flow management roster as watering continues, to reflect the passage of time and the current total flow conditions;

and wherein means for comparing the total of currently running and currently requested flow rates with a maximum overload flow rate associated with each incremental step in pump capacity; and means for expanding the pump capacity by one increment if the compared total is greater than the overload flow rate, and granting any requests contributing to the total of currently requested flow rates.

11. Apparatus as defined in claim 10, wherein the means for granting requests also includes:

means for delaying expansion to a new pump capacity increment if the current incremental level has been in effect less than a time limit previously defined for each incremental level.

12. A method of controlling an irrigation control system in accordance with an evapotranspiration (ET) level, available pump capacity and local flow constraints, the method comprising the steps of:
supplying a watering schedule having a plurality of programmed watering times for a plurality of stations;
supplying a reference ET level (ETR) that is a representative measure of the depth of water to be spread per day in an irrigation schedule;
supplying a weather ET value representative of the weather conditions currently prevailing;
adjusting the programmed watering times in the schedule by a factor proportional to the ratio (ET/ETR), whereby the watering times will be varied qualitatively in proportion to the weather ET value;
placing the watering times as flow requests in a flow management roster; and
processing the flow requests, including
granting requests based on availability of pump capacity and maintaining flow in local zones below designated maxima, and
updating the flow management roster as watering continues, to reflect the passage of time and the current total flow conditions.

13. A method as defined in claim 12, and further comprising:
supplying an ET adjustment table containing an ET adjustment factor for each station in the schedule, the adjustment factors being referred to collectively as ETZ;
and wherein the step of adjusting the watering times includes multiplying the weather ET value by the adjustment factors, dividing by the reference value ETR, and multiplying the result by the programmed watering times to obtain the adjusted watering times.

14. A method as defined in claim 13, and further comprising:
supplying a table of precipitation values for each station in the schedule, representative of the depth of water supplied by the station in a given time, the precipitation values being referred to collectively as Pz; and
computing the programmed watering times by dividing the reference value ETR by the precipitation rate for the station;
whereby the adjusted watering times are derived by the relation ETZ/Pz.

15. A method as defined in claim 12, wherein the step of granting requests for watering at specific stations includes:
determining the flow capacity presently available in a predefined watering zone in which each station is located;
denying the request if granting it would exceed the zone capacity for water flow;
determining the current pump capacity of the irrigation system, the currently running flow rate in the system, and the currently requested additional flows; and
denying the request if the currently requested flows in the system are insufficient to justify incrementally expanding the current pump capacity of the system.

16. A method as defined in claim 15, wherein the step of granting requests also includes:
comparing the total of currently running and currently requested flow rates with a maximum overload flow rate associated with each incremental step in pump capacity; and
expanding the pump capacity by one increment if the compared total is greater than the overload flow rate, and granting any requests contributing to the total of currently requested flow rates.

17. A method as defined in claim 16, wherein the step of granting requests also includes:
delaying expansion to a new pump capacity increment if the current incremental level has been in effect less than a time limit previously defined for each incremental level.

18. A method as defined in claim 12, wherein:
the method further comprises the step of defining maximum cycle times and minimum soak times for selected stations; and
the step of processing the flow requests includes splitting the requests for the selected stations into multiple cycle requests separated by soak times.

* * * * *